United States Patent
Han et al.

(10) Patent No.: US 7,925,155 B2
(45) Date of Patent: Apr. 12, 2011

(54) TRANSMITTING BROADCAST SIGNALS IN A COMMUNICATION NETWORK

(75) Inventors: Sunan Han, Plano, TX (US); Wilson Kit-Man Chan, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 828 days.

(21) Appl. No.: 11/858,187

(22) Filed: Sep. 20, 2007

(65) Prior Publication Data
US 2009/0083822 A1    Mar. 26, 2009

(51) Int. Cl.
    *H04B 10/00*    (2006.01)
(52) U.S. Cl. .................... 398/3; 398/12; 398/45
(58) Field of Classification Search ............ 398/3–5, 398/45–46, 12
    See application file for complete search history.

(56) References Cited

U.S. PATENT DOCUMENTS

| | | | |
|---|---|---|---|
| 2001/0026384 A1* | 10/2001 | Sakano et al. | 359/124 |
| 2004/0114925 A1* | 6/2004 | Berthold et al. | 398/45 |
| 2005/0195864 A1* | 9/2005 | Matsuo et al. | 370/538 |
| 2006/0045519 A1* | 3/2006 | Oren | 398/4 |
| 2007/0264008 A1* | 11/2007 | Zaacks et al. | 398/3 |

OTHER PUBLICATIONS

"*Verizon Laboratories Technology Update: Transforming Communications*", VTO Technology, Verizon, pp. 1-14, 2006.
"*Technology Organization Systems Integration & Testing*", MVA Communications Ecosystem Conference, Chuck Graff, Director, pp. 1-69, Feb. 28, 2007.
"*FTTP System Architecture*", End-to-End Architecture, 5 pages, http://www.ripuc.ri.gov/utilityinfo/cabletv/2007c_ fttp6.pdf, Printed Sep. 14, 2007.

* cited by examiner

*Primary Examiner* — Dzung D Tran
(74) *Attorney, Agent, or Firm* — Baker Botts L.L.P.

(57) ABSTRACT

In one embodiment, a facilitating signal broadcasting includes receiving a first copy of a signal at a first selector of a first headend, where the first copy is received through a first receive pipe of a first ring. A second copy of the signal is received at the first selector, where the second copy is received through a second receive pipe of a second ring. The first selector selects either the first copy or the second copy. The selected copy is sent through a first transmit pipe of the first ring.

16 Claims, 4 Drawing Sheets

US 7,925,155 B2

TRANSMITTING BROADCAST SIGNALS IN A COMMUNICATION NETWORK

TECHNICAL FIELD

This invention relates generally to the field of communication networks and more specifically to transmitting broadcast signals in a communication network.

BACKGROUND

Video headend offices (VHOs) of communication networks broadcast video signals to video serving offices (VSOs), which provide the signals to subscribers. Typically, greater capacity allows a network to communicate more information to more subscribers. In addition, failure protection allows serving offices to receive signals if there is a failure in a network. Known communication networks, however, do not provide sufficient transmission efficiency and/or failure protection in certain situations.

SUMMARY OF THE DISCLOSURE

In accordance with the present invention, disadvantages and problems associated with previous techniques for broadcasting signals in a communication network may be reduced or eliminated.

According to one embodiment of the present invention, a facilitating signal broadcasting includes receiving a first copy of a signal at a first selector of a first headend, where the first copy is received through a first receive pipe of a first ring. A second copy of the signal is received at the first selector, where the second copy is received through a second receive pipe of a second ring. The first selector selects either the first copy or the second copy. The selected copy is sent through a first transmit pipe of the first ring.

Certain embodiments of the invention may provide one or more technical advantages. A technical advantage of one embodiment may be that headends of a network each include a flexponder that has sub-wavelength capabilities. A headend aggregates video signals from different headends for transmission at the same wavelength. Accordingly, pass-through nodes need not have sub-wavelength capabilities.

Another technical advantage of one embodiment may be that a headend receives copies of signals from receive pipes of a ring network. A selector of the headend selects a copy and communicates the selected copy to though a transmit pipe, and another selector of the headend selects a copy and communicates the selected copy to though another transmit pipe. Communicating copies of the signals through different pipes provides protection in the event of a failure of a pipe.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 3B of the drawings, like numerals being used for like and corresponding parts of the various drawings.

Figure 1:
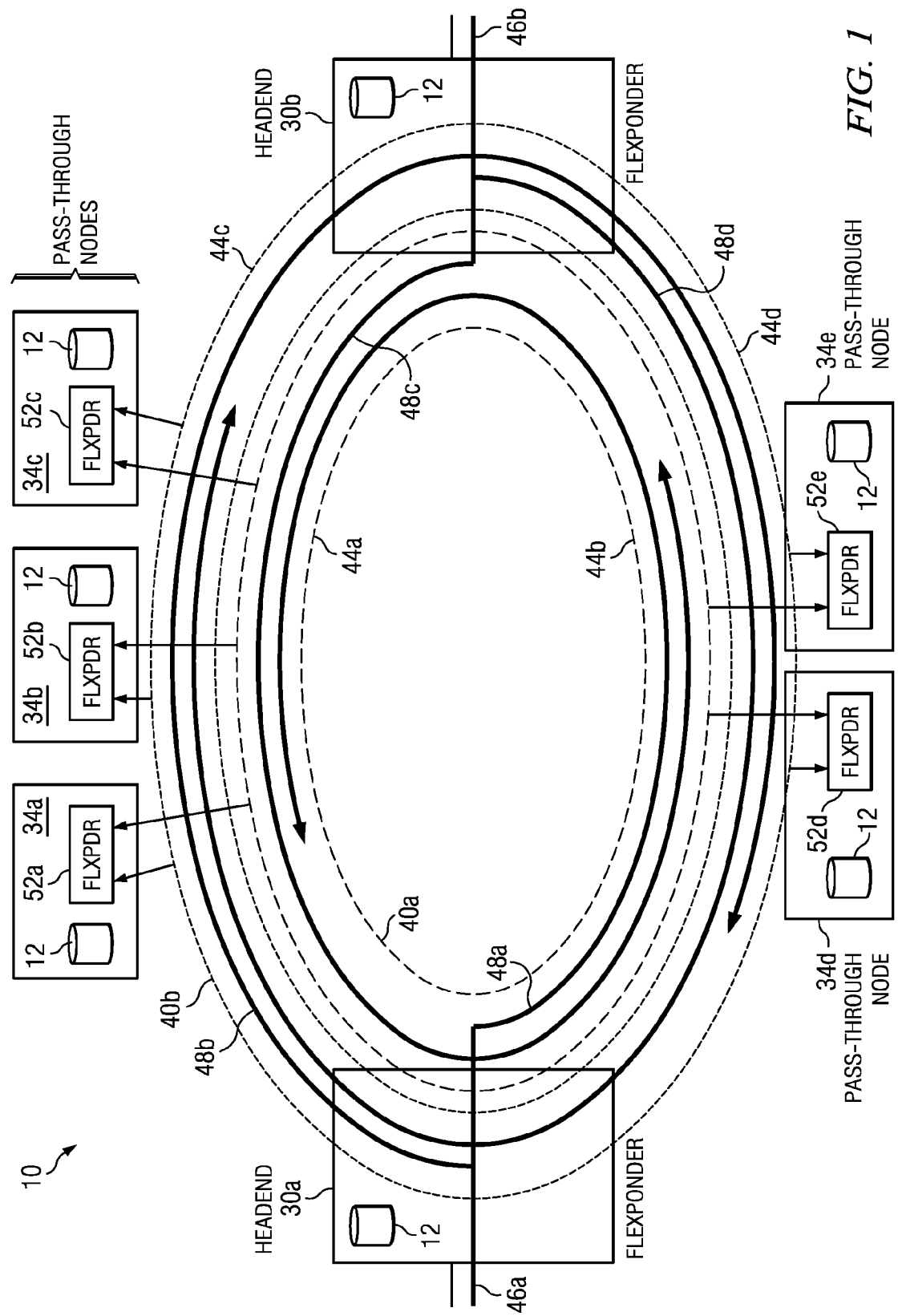
FIG. 1 illustrates one example of an embodiment of a network that broadcasts signals.

FIG. 1 illustrates one example of an embodiment of a network 10 that broadcasts signals. In the illustrated embodiment, network 10 includes rings 40 that couple one or more headends 30 and one or more pass-through nodes 34 as shown. Rings 40 include pipes 44. In an example of operation, headend 30 transmits and receives copies of signals from pipes 44. Communicating copies of the signals through different pipes 44 provides protection in the event of the failure of a pipe 44.

In the illustrated embodiment, headends 30 include headends 30a and 30b that can operate at the same or different wavelengths. In one embodiment, a headend 30 comprises a video headend office (VHO), and performs Multiservice Provisioning Platform (MSPP) operations at any suitable wavelength levels, such as at wavelength or sub-wavelength levels.

A headend 30 receives a signal 46 from a signal source. Signal 46 may communicate any suitable information, such as video, audio, text, and/or multimedia. Headend 30 transmits signals 48 that are copies of signal 46. In the illustrated embodiment, headend 30a transmits signals 48a and 48b, and headend 30b transmits signals 48c and 48d. A signal 48 may be an optical signal with any suitable wavelength and data rate, such as a data rate in the range of 1 to 40 gigabits per second (G). For example, signal 48 may be a gigabit Ethernet (GigE) signal of 1.2 G or an OC-48 signal of 2.5 G. Signals 48 are communicated through rings 44.

In the illustrated embodiment, rings 40 include rings 40a and 40b, where ring 40a communicates signals 48a and 48c in one direction and ring 40b communicates signals 48b and 48d in the other direction. According to one embodiment, a ring 40 may comprise an optical fiber ring. An optical fiber ring may have one or more rings 40. Ring 40 may utilize any suitable protocols or any suitable transmission technique, such as Synchronous Optical Network (SONET) with Dense Wavelength Division Multiplexing techniques. In one embodiment, rings 40 may communicate signals at the same wavelength.

A ring 40 includes pipes 44 that communicate signals 48 between headends 30. In the illustrated embodiment, ring 40a includes pipes 44a and 44b, and ring 40b includes pipes 44c and 44d. A pipe 44 may have any suitable capacity, such as a capacity in the range of 1 to 100 gigabits (G), such as 2.5 G or 10 G. In one embodiment, a ring 40 may communicate up to 8 GigE from headend 30 to pass-through nodes 34.

A pipe 44 communicates signals 48 to or from headends 30. A pipe 44 operates as a transmit pipe for a headend 30 if pipe 44 transmits signals 48 from headend 30. A pipe 44 operates as a receive pipe for a headend 30 if headend 30 receives signals 48 through pipe 44. For example, pipe 44b operates as a transmit pipe for headend 30a and a receive pipe for headend 30b.

In one embodiment, a pipe 44 communicates signals 48 from headends 30a and 30b. For example, pipes 44a and 44b each communicate signal 48a from headend 30a and signal 48c from headend 30b, and pipes 44c and 44d each communicate signal 48b from headend 30a and signal 48d from headend 30b. Multiple pipes 44 communicating multiple copies of signals 46a and 46b may provide fault protection if there is a failure of one or more pipes 44. A switch fabric is associated with transmit and receive pipes 44 that form rings 40 and headend selectors.

In the illustrated embodiment, pass-through nodes 34 includes pass-through nodes 34a, 34b, 34c, 34d, and 34e. In one embodiment, a pass-through node 34 comprises a video serving office (VSO). A pass-through node 34 receives signals 48 from rings 40 or pipes 44 and communicates signals 48 to endpoints, such as subscriber endpoints. A pass-through node 34 can be an optical add-drop multiplexer (OADM) that performs optical drop-and-continue.

Pass-through node 34 may comprise a flexponder (flxpdr) 52. A flexponder (flxpdr) 52 includes an optical selector that selects a signal 48, such as a higher quality signal 48, received from pipes 44. In one embodiment, flexponder 52 does not require sub-wavelength activity, so if the signal format is compatible with that of headends 30, any transponder can achieve the same functionality. In one embodiment, if headends 30 communicate at the same wavelength through sub-wavelength cross-connecting, a pass-through node 34 does not require more than one flexponder 52 to accommodate signals from headends 30.

A component of network 10 may include an interface, logic, memory 12, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory 12 stores information. A memory 12 may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic comprising software, hardware, and/or other logic. As used in this document, "each" refers to each member of a set or each member of a subset of a set.

Figure 2:
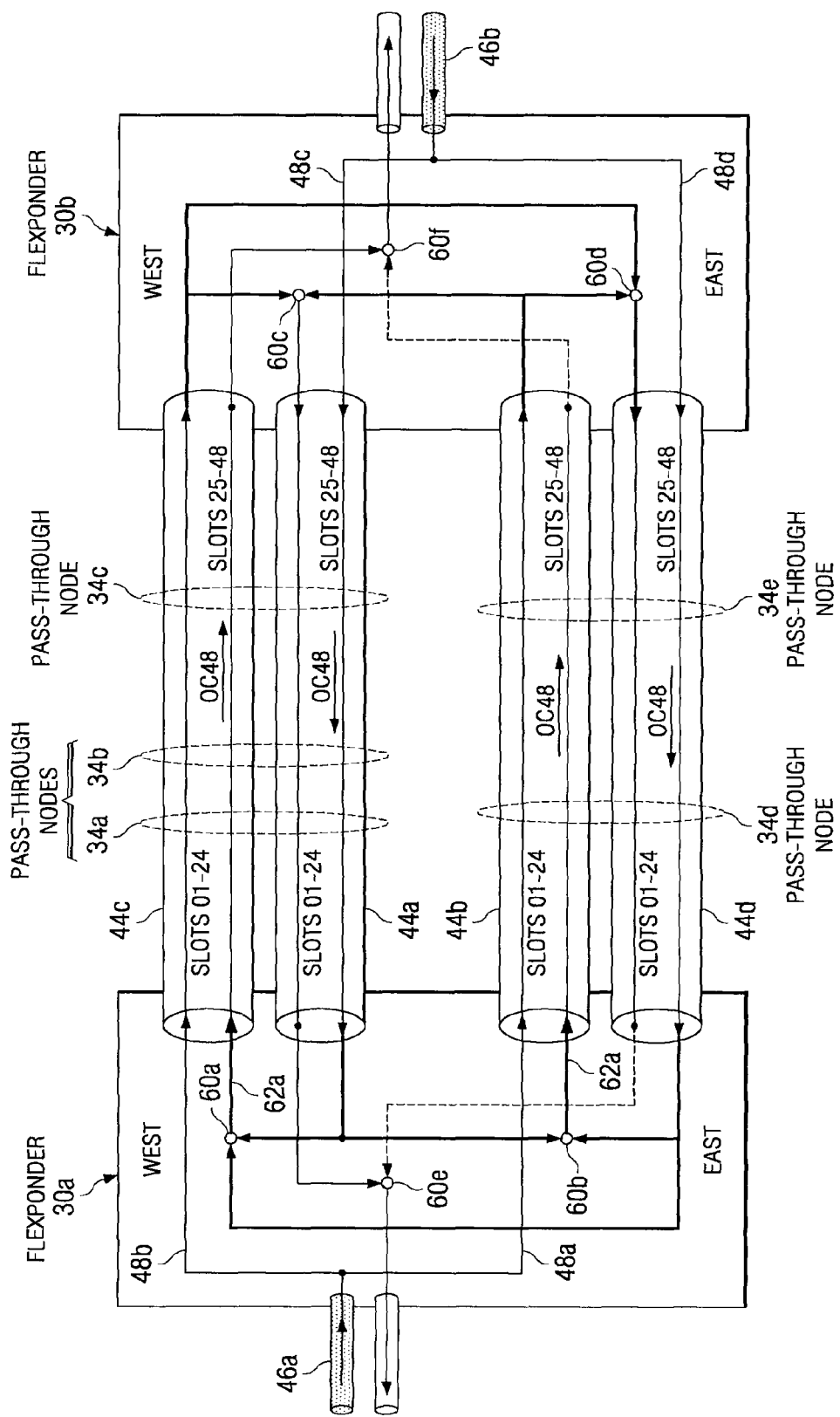
FIG. 2 illustrates examples of embodiments of headends that may be used with the network of FIG. 1.

FIG. 2 illustrates examples of embodiments of headends 30 that may be used with network 10 of FIG. 1. In one embodiment, signal 46 is a GigE signal. Pipe 44 represents an OC-48 pipe with a 2.5 G wavelength that can communicate a SONET OC-48 transmission signal. An OC-48 pipe can carry 2 GigE signals. An OC-48 pipe has 48 time slots, each for a Synchronous Transport Signal-1 (STS-1) signal, according to time division multiplexing (TDM). Certain slots of pipes 44 are designated for signals originating from one headend 30 and other slots are designated for signals originating from another headend 30. In the illustrated example, slots 1-24 are designated for signals 48a and 48b from headend 30a, and slots 25-48 communicate signals 48c and 48d from headend 30b.

A headend 30 includes one or more transponders. A transponder, such as a flexponder, communicates at one wavelength. The flexponders multiplex, aggregate, and groom signals at the sub-wavelength levels, such as at levels comprising groups of one or more STS-1 signals.

In one embodiment, headends 30 include selectors 60, such as Unidirectional Path Switched Ring (UPSR) selectors. In the illustrated example, headend 30a include selectors 60a, 60b, and 60e, and headend 30b include selectors 60c, 60d, and 60f.

Selector 60 receives signals 48 that are copies of signal 46, and selects a signal 48 for transmission along pipe 44. For example, selector 60 selects a default signal 48 if both signals 48 are good signals, or selects a good signal if the other signal is a bad signal. In the illustrated embodiment, in headend 30a, selector 60a receives copy signals 48c and 48d, selects a signal 48, and transmits the selected signal through output 62a to transmit pipe 44c. Selector 60b receives copy signals 48c and 48d, selects a signal 48, and transmits the selected signal through output 62b to transmit pipe 44b.

Selector 60 may select a signal 48 in any suitable manner. For example, selector 60 monitors signals 48. Selector 60 selects a default signal 48 if both signals 48 are acceptable (for example, are of sufficient quality), or selects one signal 48 if the other signal 48 is not acceptable. The quality may be based on any suitable criteria, such as the path selection criteria of the R5-37/38 Specification of GR-1400.

Communicating copies of the signals through different pipes 44 provides protection in the event of the failure of a pipe 44. An example of failure protecting is described with reference to FIGS. 3A and 3B.

Modifications, additions, or omissions may be made to headend 30 without departing from the scope of the invention. The components of headend 30 may be integrated or separated. Moreover, the operations of headend 30 may be performed by more, fewer, or other components.

Figure 3A:
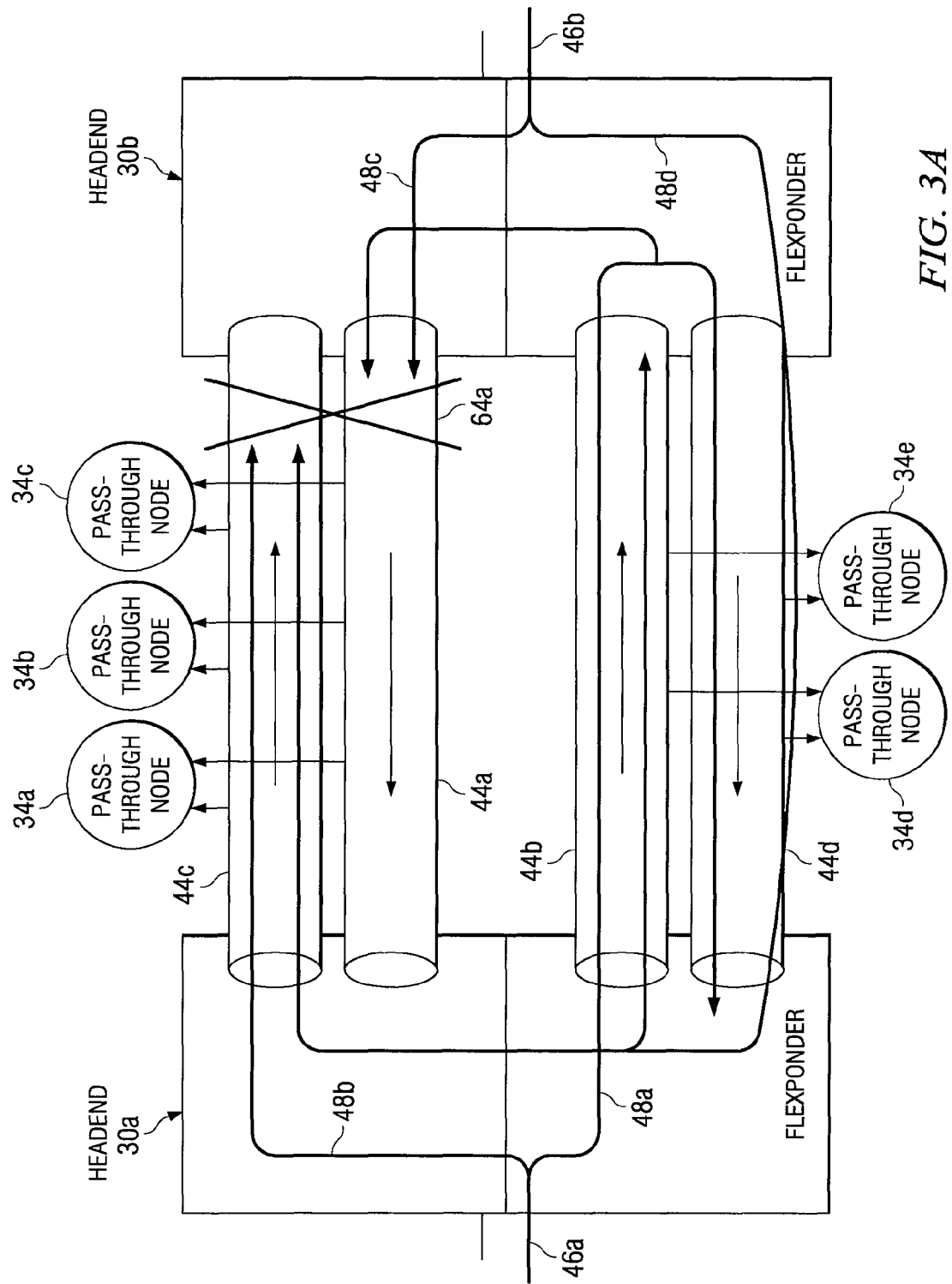
FIGS. 3A and 3B illustrate one example of one embodiment of a method for responding to a failure in the network of FIG. 1.
Figure 3B:
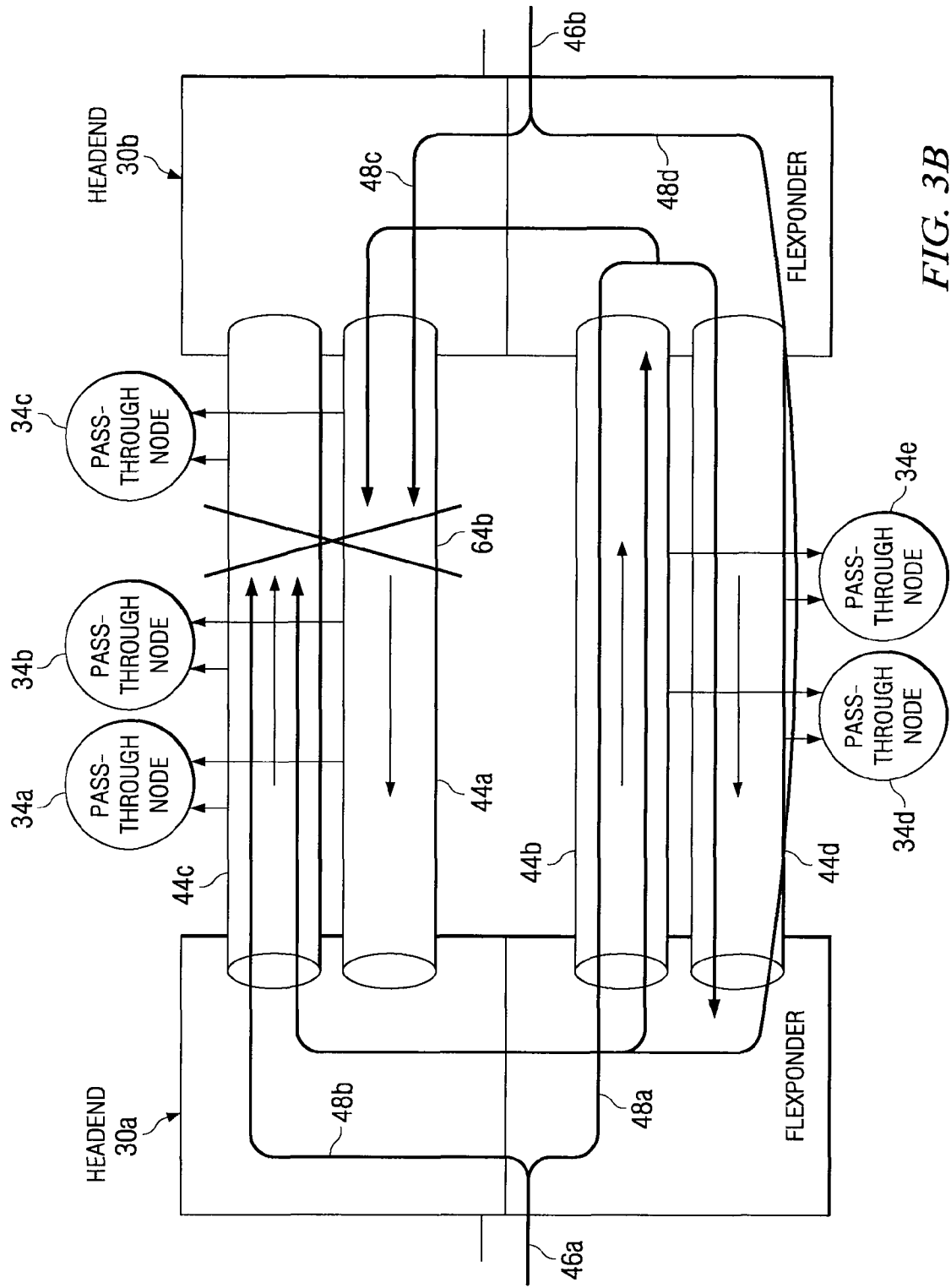

FIGS. 3A and 3B illustrate an example of one embodiment of a method for responding to a failure in network 10. A failure may comprise a fiber cut failure that occurs when a fiber cannot communicate signals. FIG. 3A illustrates signals 48 communicating through pipes 44 and a failure 64a occurs. Failure 64a occurs between pass-through node 34c and headend 30b. Pass-through nodes 34a, 34b, and 34c, however, still receive signal 46a from headend 30a through pipe 44c, and signal 46b from headend 30b through pipe 44d and pipe 44c.

FIG. 3B illustrates signals 48 communicating through pipes 44 and a failure 64b occurs. Failure 64b occurs between pass-through nodes 34b and 34c. Pass-through nodes 34a and 34b, however, receive signal 46a from headend 30a through pipe 44c, and signal 46b from headend 30b through pipe 44d and pipe 44c. Moreover, node 34c receives signals 46a and 46b from pipe 44a.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a headend receives copies of signals from receive pipes of a ring network. A selector of the headend selects a copy and communicates the selected copy to though a transmit pipe, and another selector of the headend selects a copy and communicates the selected copy to though another transmit pipe. Communicating copies of the signals through different pipes provides protection in the event of a failure of a pipe.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the spirit and scope of this disclosure, as defined by the following claims.

What is claimed is:

1. A method for facilitating signal broadcasting, comprising:
receiving a first copy of a signal at a first selector of a first headend, the first copy received through a first receive pipe of a first ring;
receiving a second copy of the signal at the first selector, the second copy received through a second receive pipe of a second ring;
selecting by the first selector either the first copy or the second copy;
sending the selected copy through a first transmit pipe of the first ring;
receiving the first copy of the signal at a second selector of the first headend, the first copy received through the first receive pipe of the first ring;
receiving the second copy of the signal at the second selector, the second copy received through the second receive pipe of the second ring;
selecting by the second selector either the first copy or the second copy; and
sending the selected copy through a second transmit pipe of the second ring.

2. The method of claim 1, wherein selecting by the first selector either the first copy or the second copy further comprises:
selecting a default copy if the first copy and the second copy are acceptable.

3. The method of claim 1, wherein the first selector comprises a Unidirectional Path Switched Ring (UPSR) selector.

4. The method of claim 1, wherein the signal communicates video media.

5. The method of claim 1, wherein the first pipe passes through a pass-through node comprising:
an optical add-drop multiplexer (OADM) operable to performs optical drop-and-continue; and
a flexponder operable to select one or more signals from the first ring or the second ring.

6. The method of claim 1, wherein the signal is sent by a second headend at a second wavelength, the first headend sending another signal at a first wavelength, the first wavelength substantially equivalent to the second wavelength.

7. A system for facilitating signal broadcasting, comprising:
a first selector of a first headend, the first selector operable to:
receive a first copy of a signal, the first copy received through a first receive pipe of a first ring;
receive a second copy of the signal, the second copy received through a second receive pipe of a second ring;
select either the first copy or the second copy;
a first output coupled to the first selector and operable to send the selected copy through a first transmit pipe of the first ring;
a second selector of the first headend, the second selector operable to:
receive the first copy of the signal, the first copy received through the first receive pipe of the first ring;
receive the second copy of the signal, the second copy received through the second receive pipe of the second ring;
select either the first copy or the second copy; and
a second output coupled to the second selector and operable to send the selected copy through a second transmit pipe of the second ring.

8. The system of claim 7, the first selector further operable to select either the first copy or the second copy by:
selecting a default copy if the first copy and the second copy are acceptable.

9. The system of claim 7, wherein the first selector comprises a Unidirectional Path Switched Ring (UPSR) selector.

10. The system of claim 7, wherein the signal communicates video media.

11. The system of claim 7, wherein the first pipe passes through a pass-through node comprising:
an optical add-drop multiplexer (OADM) operable to performs optical drop-and-continue; and
a flexponder operable to select one or more signals from the first ring or the second ring.

12. The system of claim 7, wherein the signal is sent by a second headend at a second wavelength, the first headend sending another signal at a first wavelength, the first wavelength substantially equivalent to the second wavelength.

13. Logic for facilitating signal broadcasting, the logic embodied in a non-transitory computer-readable storage medium and when executed by a computed operable to:
receive a first copy of a signal at a first selector of a first headend, the first copy received through a first receive pipe of a first ring;
receive a second copy of the signal at the first selector, the second copy received through a second receive pipe of a second ring;
select by the first selector either the first copy or the second copy;
send the selected copy through a first transmit pipe of the first ring;
receiving the first copy of the signal at a second selector of the first headend, the first copy received through the first receive pipe of the first ring;
receiving the second copy of the signal at the second selector, the second copy received through the second receive pipe of the second ring;
selecting by the second selector either the first copy or the second copy; and
sending the selected copy through a second transmit pipe of the second ring.

14. The logic of claim 13, further operable to select by the first selector either the first copy or the second copy by:
selecting a default copy if the first copy and the second copy are acceptable.

15. The logic of claim 13, wherein the first pipe passes through a pass-through node comprising:
an optical add-drop multiplexer (OADM) operable to performs optical drop-and-continue; and
a flexponder operable to select one or more signals from the first ring or the second ring.

16. The logic of claim 13, wherein the signal is sent by a second headend at a second wavelength, the first headend sending another signal at a first wavelength, the first wavelength substantially equivalent to the second wavelength.

* * * * *